United States Patent
Samuel, Jr.

(10) Patent No.: US 10,793,063 B1
(45) Date of Patent: Oct. 6, 2020

(54) ILLUMINATED STEERING WHEEL COVER ASSEMBLY

(71) Applicant: Carl Samuel, Jr., Bronx, NY (US)

(72) Inventor: Carl Samuel, Jr., Bronx, NY (US)

( * ) Notice: Subject to any disclaimer, the term of this patent is extended or adjusted under 35 U.S.C. 154(b) by 0 days.

(21) Appl. No.: 16/527,164

(22) Filed: Jul. 31, 2019

(51) Int. Cl.
  B60Q 3/283 (2017.01)
  B62D 1/06 (2006.01)
  F21V 23/06 (2006.01)
  B60Q 3/80 (2017.01)
  B62D 1/04 (2006.01)

(52) U.S. Cl.
  CPC .............. B60Q 3/283 (2017.02); B60Q 3/80 (2017.02); B62D 1/046 (2013.01); B62D 1/06 (2013.01); F21V 23/06 (2013.01)

(58) Field of Classification Search
  CPC ...................................................... B60Q 3/283
  See application file for complete search history.

(56) References Cited

U.S. PATENT DOCUMENTS

| | | | |
|---|---|---|---|
| D475,334 S * | 6/2003 | Peng | B60Q 5/005 D12/177 |
| 7,934,439 B2 | 5/2011 | Bostick | |
| 9,045,078 B2 | 6/2015 | Tovar | |
| 9,272,725 B2 | 3/2016 | Pekari | |
| 9,873,446 B2 | 1/2018 | Gardner | |
| 10,011,222 B1 | 7/2018 | Wu | |
| 2014/0111325 A1 | 4/2014 | Lisseman | |
| 2014/0300458 A1 * | 10/2014 | Bennett | B60Q 5/005 340/439 |
| 2015/0375677 A1 | 12/2015 | Salter | |

FOREIGN PATENT DOCUMENTS

| | | |
|---|---|---|
| JP | 2005088792 | 4/2005 |
| WO | WO9803365 | 1/1998 |

\* cited by examiner

*Primary Examiner* — Sean P Gramling (57) ABSTRACT

An illuminated steering wheel cover assembly includes a cover that is removably positioned on a steering wheel. The cover has a circular shape to match a circular shape of the steering wheel. A plurality of light emitters is mounted in the cover. The light emitters emit light outwardly from the cover when turned on. Each of the light emitters comprising an LED capable of emitting multiples colors. A control circuit is electrically coupled to each of the light emitters. An actuator is electrically coupled to the control circuit and is actuated to turn the light emitters on or off.

13 Claims, 9 Drawing Sheets

FIG. 9

ILLUMINATED STEERING WHEEL COVER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to decorative steering wheel cover device and more particularly pertains to a new decorative steering wheel cover device for positioning on a steering wheel such that the steering wheel has a decorative appearance.

(2) Description of Related Art Including Information Disclosed Under 37 CFR 1.97 and 1.98

The prior art relates to decorative or non-decorative steering wheel cover devices that are used for covering, typically for protection or gripping purposes, the surface of a conventional steering wheel.

BRIEF SUMMARY OF THE INVENTION

An embodiment of the disclosure meets the needs presented above by generally comprising a cover that is removably positioned on a steering wheel. The cover has a circular shape to match a circular shape of the steering wheel. A plurality of light emitters is mounted in the cover. The light emitters emit light outwardly from the cover when turned on. Each of the light emitters comprising an LED capable of emitting multiples colors. A control circuit is electrically coupled to each of the light emitters. An actuator is electrically coupled to the control circuit and is actuated to turn the light emitters on or off.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

With reference now to the drawings, and in particular to FIGS. 1 through 9 thereof, a new decorative steering wheel cover device embodying the principles and concepts of an embodiment of the disclosure and generally designated by the reference numeral 10 will be described.

As best illustrated in FIGS. 1 through 9, the illuminated steering wheel cover assembly 10 generally comprises a cover 12 that is configured to be removably positioned on a steering wheel 14. The cover has 12 a circular shape to match a circular shape of the steering wheel 14. The cover 12 includes a tubular wall 16 having a first end 18 and a second end 20 wherein the first 18 and second 20 ends are positioned adjacent to each other to form the circular shape. The tubular wall 16 has a break 22 therein extending through an inner surface 24 and an outer surface 26 of the tubular wall 16. The break 22 extends from the first end 18 to the second end 20. The break 22 is configured to receive the steering wheel 14 such that the tubular wall 16 is positioned on and covers a front side of the steering wheel 14. The tubular wall 16 is comprised of a resiliently bendable material. The resiliently bendable material is a translucent material which may be transparent. The break 22 is defined between a first lateral edge 28 and a second edge 30 of the tubular wall 16.

As can be seen in the Figures, a first rod 32 may be positioned within the tubular wall 16 adjacent to and extending along a length of the first lateral edge 28, while a second rod 34 is positioned within the tubular wall 16 adjacent to and extending along a length of the second lateral edge 30. While still bendable, the first 32 and second 34 rods have a greater rigidity than the tubular wall 16 and to retain the cover 12 in the circular shape and to snappily couple the cover 12 to the steering wheel 14 so that the steering wheel 14 is positioned between the first 32 and second 34 rods. The first 32 and second 34 rods are comprised of a metallic material though elastomers, plastics, graphite composites and the like may be utilized instead.

A plurality of light emitters 36 is mounted in the cover 12. The plurality of light emitters 34 emit light outwardly from the cover when turned on. While any conventional light emitter 34 may be utilized, typically the light emitters 34 will each comprise an LED. Each LED may be a single colored LED or may comprise an LED capable of emitting multiples colors. A control circuit 38 is electrically coupled to each of the light emitters 36 and a power source 40 is electrically coupled to the control circuit 38. The power source 40 may comprise a rechargeable battery mounted on the cover 12, such as within a housing attached to the cover 12.

An actuator 42 is electrically coupled to the control circuit 38 to control the light emitters 36 and is thereby actuated to turn the light emitters 36 on or off. The actuator 42 actuated to cause the light emitters 36 to emit light in one of a plurality of patterns programmed into the control circuit 38. For example, the patterns may include a single color steady light, the light intensity alternating between increasing and decreasing, the light emitters 36 all changing from one color to another, the light emitters 36 changing colors to provide the appearance of a single color moving around the steering wheel while a remainder of the light emitters emit second color, flashing light, shapes and like. Essentially there is little to limit the number of patterns available and such technology is conventional to novelty toy, for instance.

The actuator 42 may be provided in one or more structures which are used either alone or may utilized together. For example, the actuator 42 may comprise a switch 44, or multiple switches, positioned on the tubular wall 16 which may be actuated for power and pattern selection purposes. The actuator 42 may include a wireless receiver 46 which is in communication with a controller configured to wirelessly send signals to the wireless receiver 46. The controller may include, for instance, a cellular phone application to allow the wireless features of the cellular phone to connect to the wireless receiver 46. The actuator 42 may further comprise a microphone 48 configured to receive audible commands interpretable by the control circuit 38. The commands would typically be pre-programmed onto the control circuit 38 though aftermarket programming through a wireless application may be utilized as well.

Figure 1:
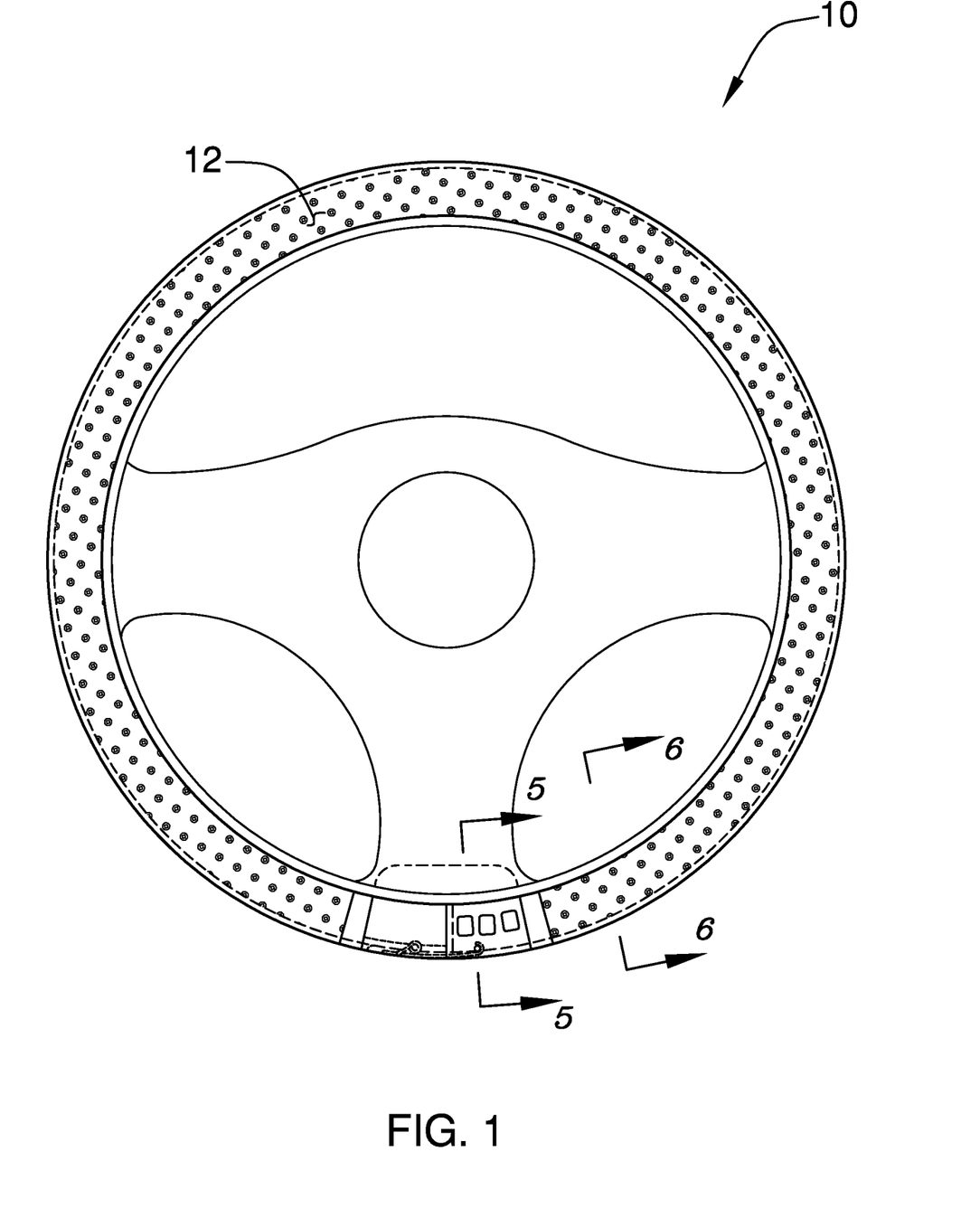
FIG. 1 is a front view of an illuminated steering wheel cover assembly according to an embodiment of the disclosure.
Figure 2:
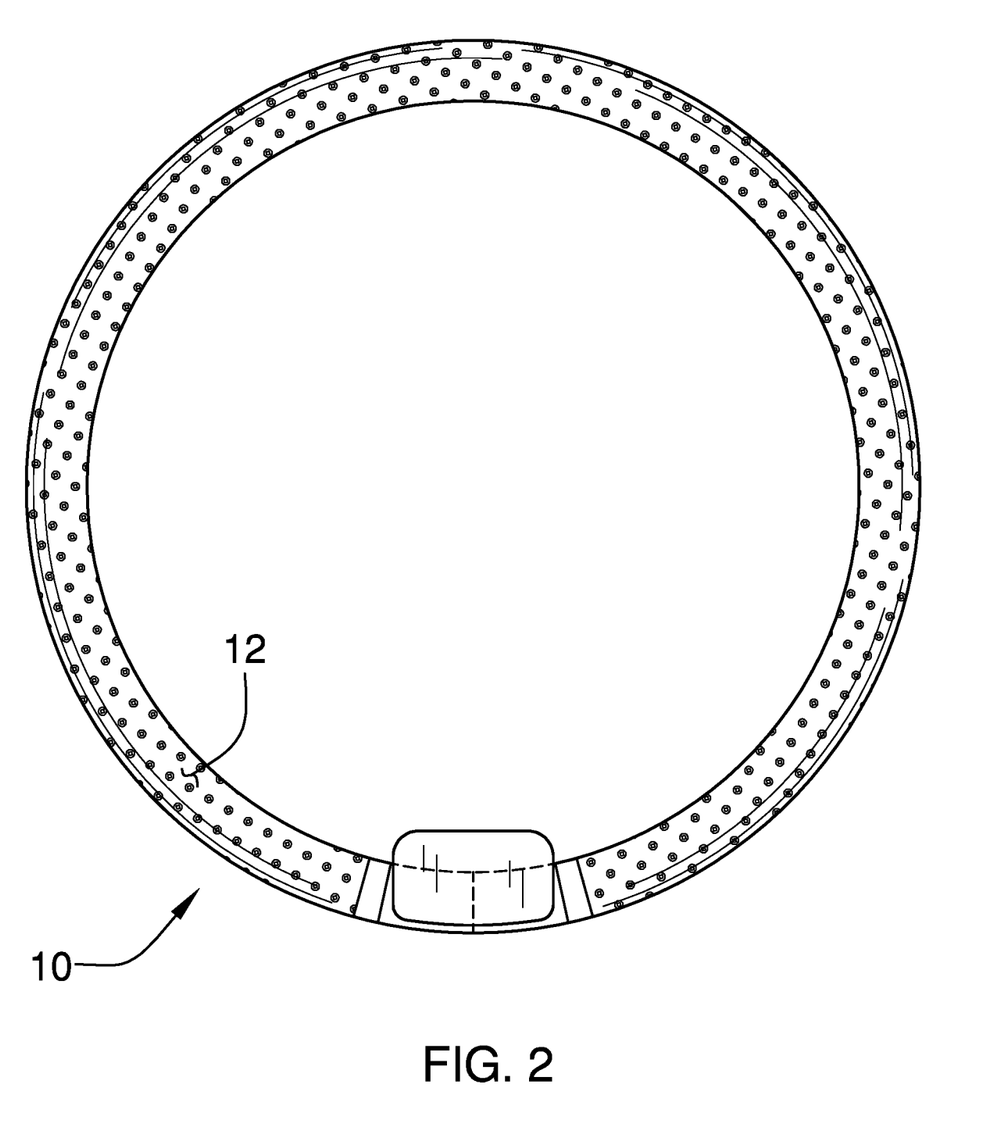
FIG. 2 is a rear view of an embodiment of the disclosure.
Figure 3:
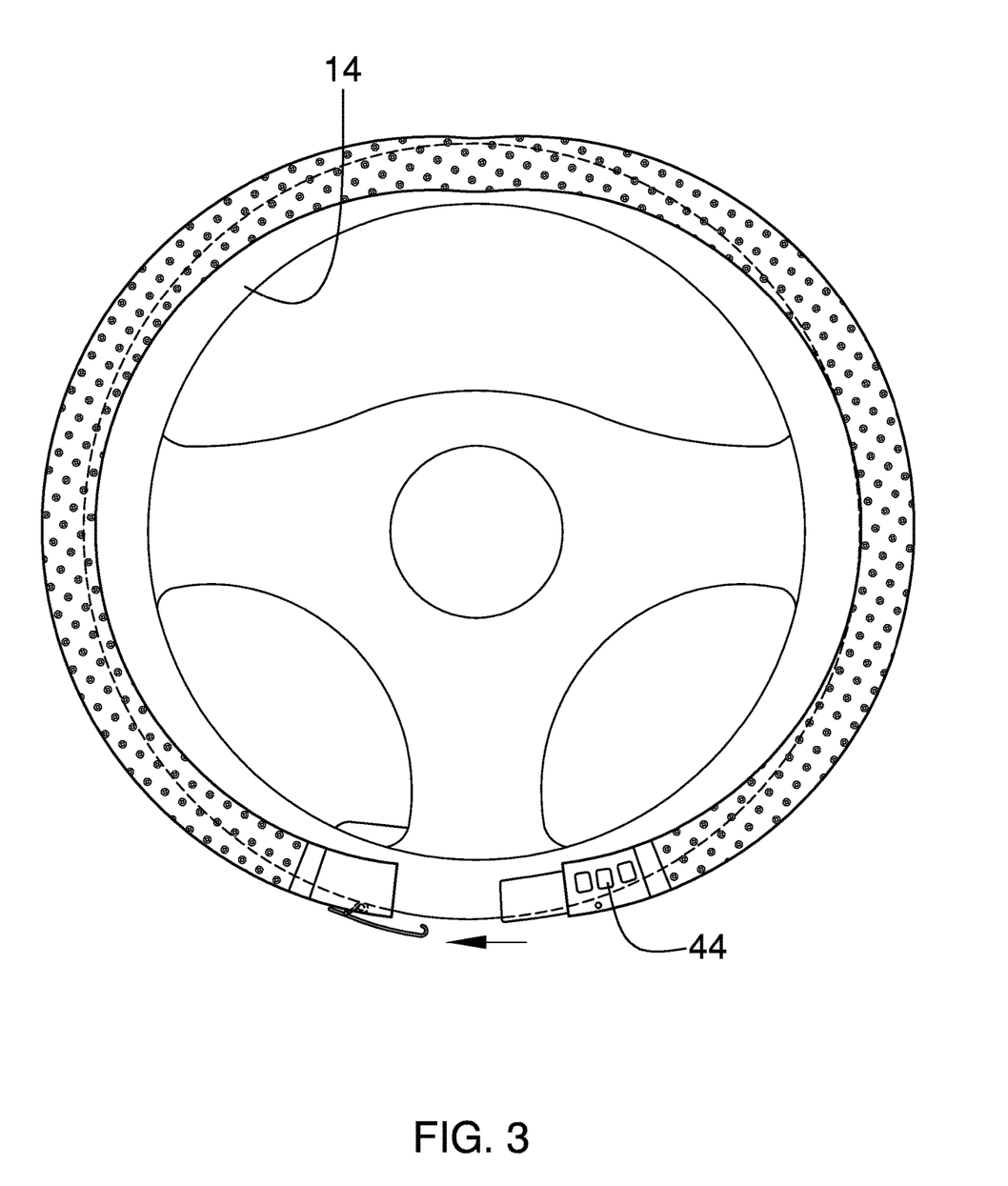
FIG. 3 is a front view of an embodiment of the disclosure.
Figure 4:
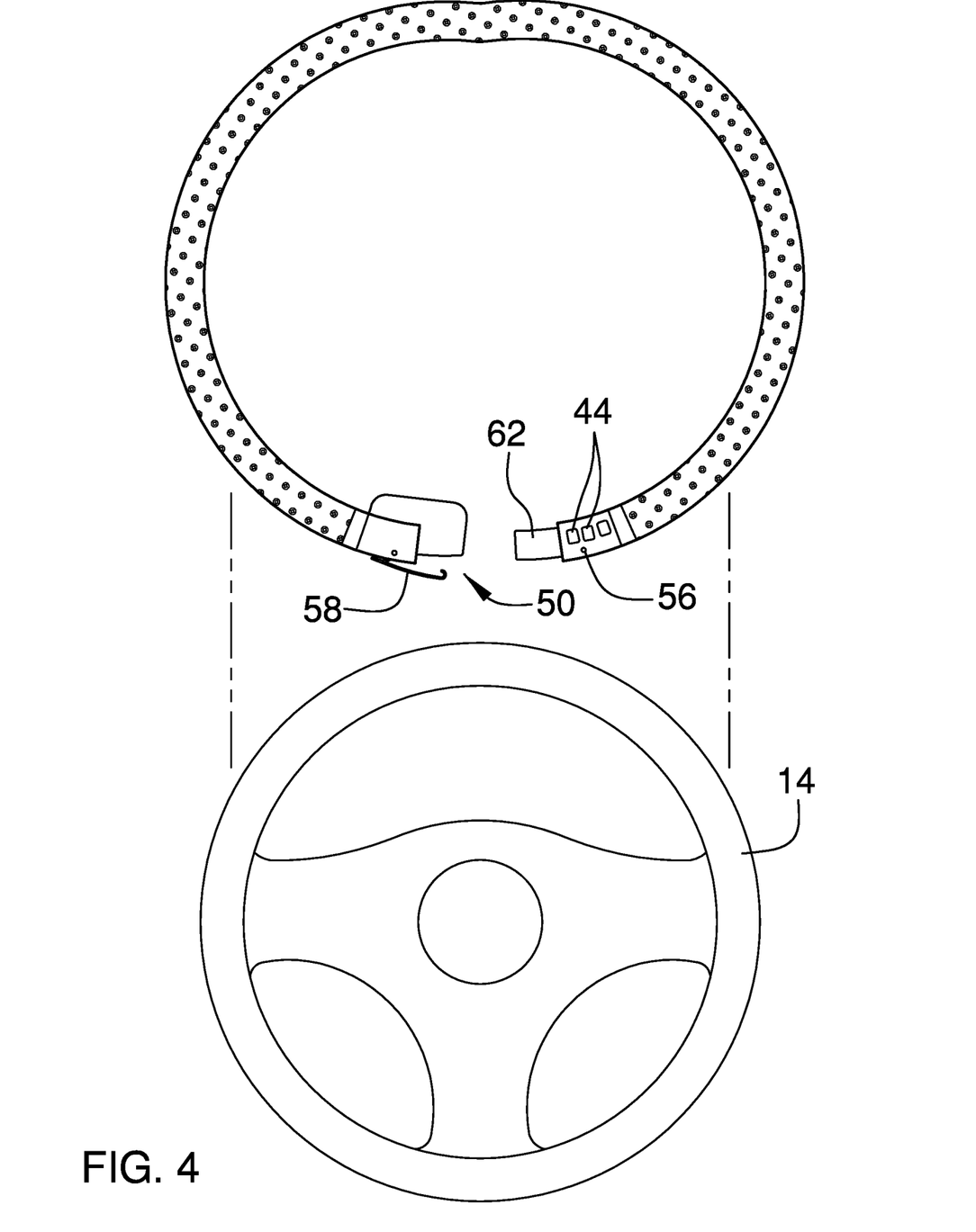
FIG. 4 is a front view of an embodiment of the disclosure.
Figure 5:
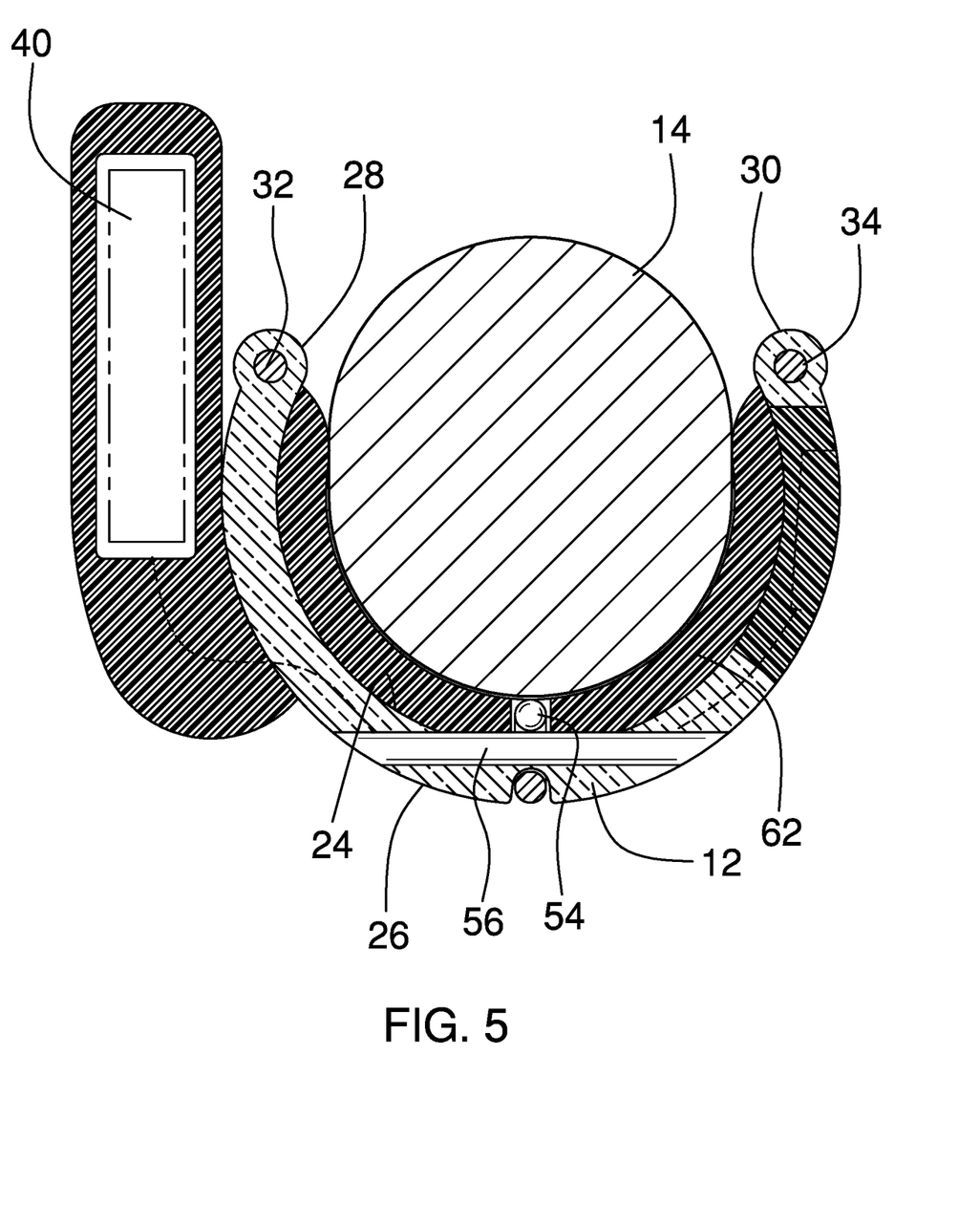
FIG. 5 is a cross-sectional view of an embodiment of the disclosure taken along line 5-5 of FIG. 1.
Figure 6:
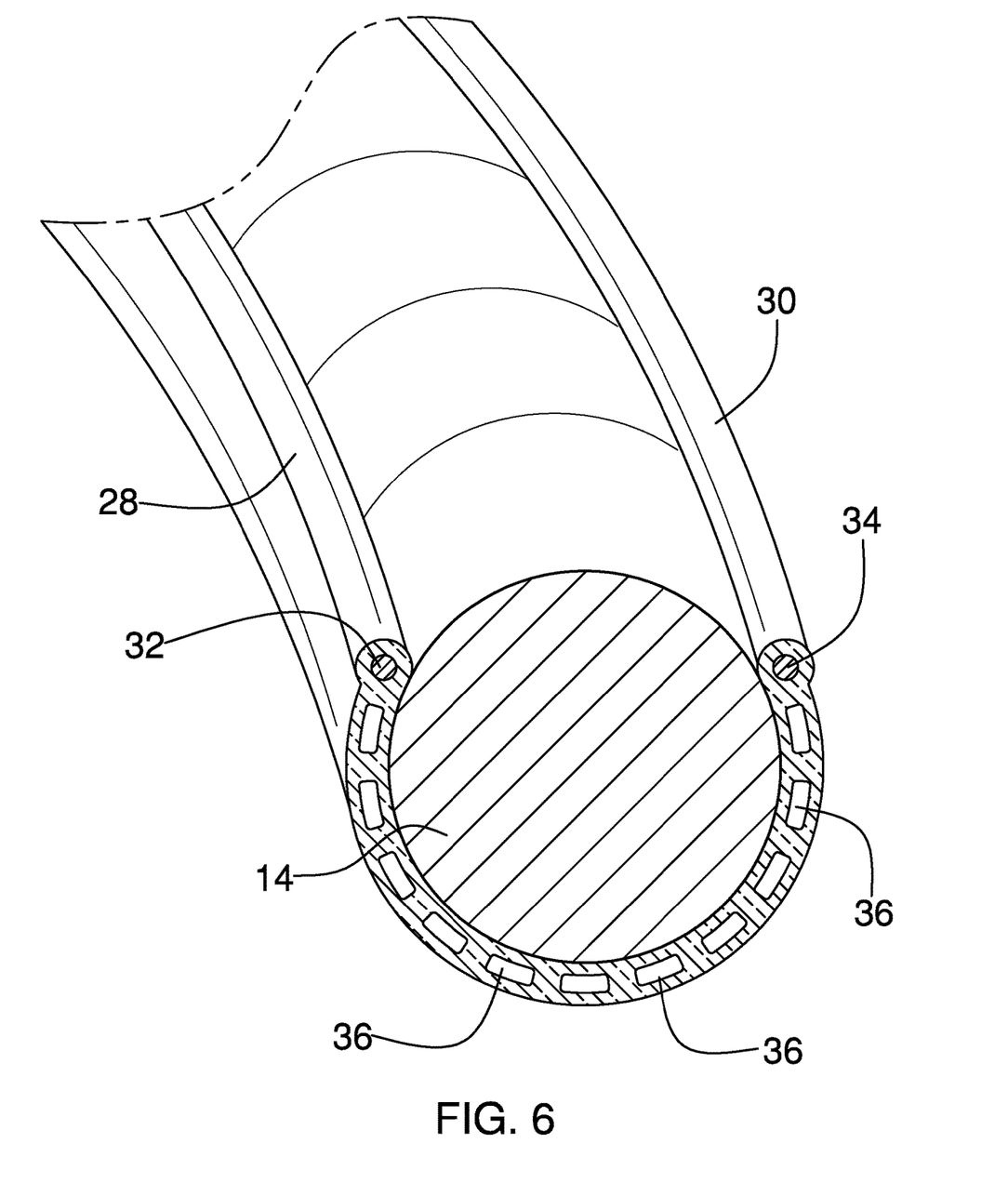
FIG. 6 is a cross-sectional view of an embodiment of the disclosure taken along line 6-6 of FIG. 1
Figure 7:
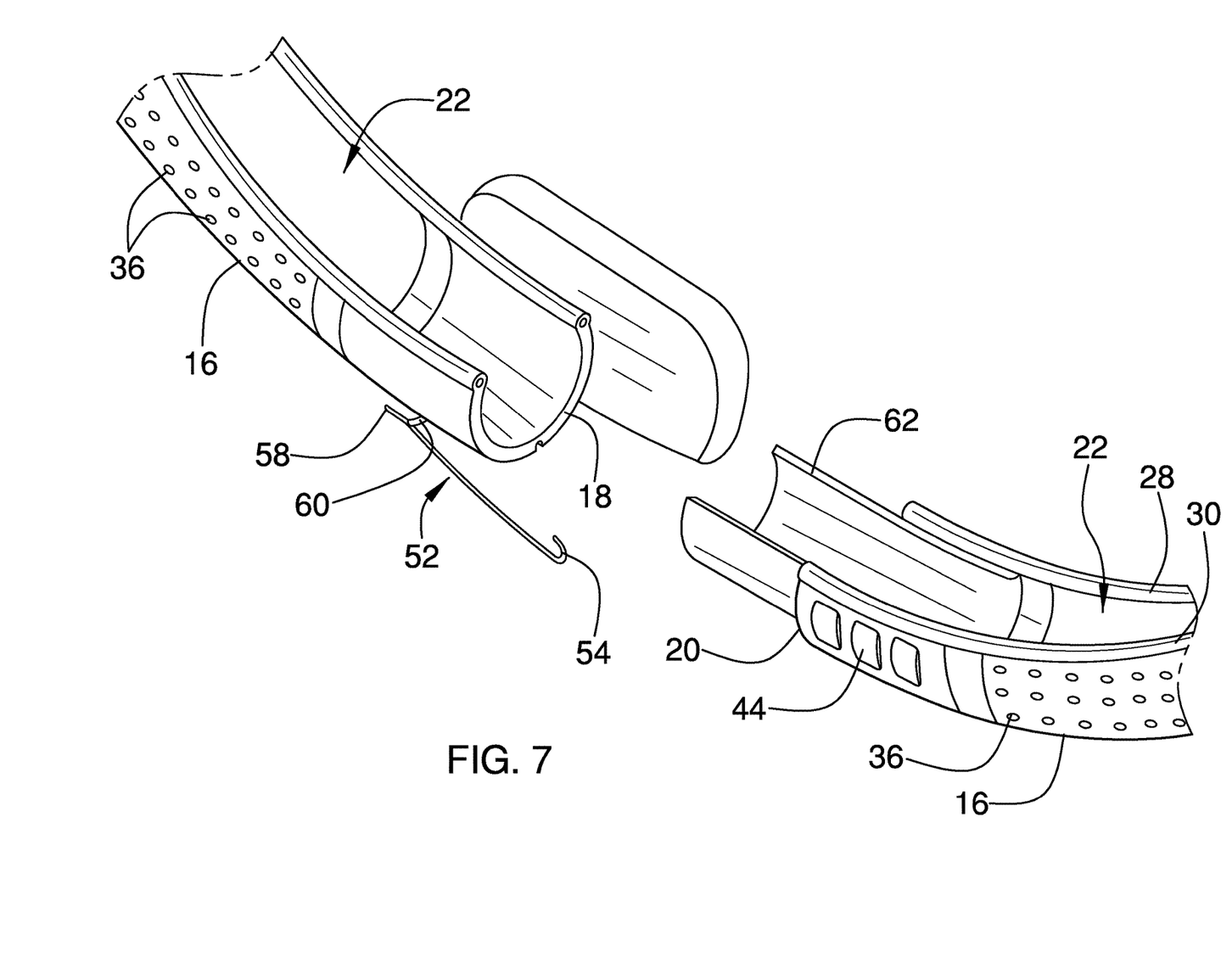
FIG. 7 is an enlarged isometric view of a closure of an embodiment of the disclosure.

A closure 50 is mounted on the tubular wall 16 and releasably secures the first end 18 to the second end 20. The closure 50 includes a latch 52 having a free end formed into a hook 54. The latch 52 is pivotally coupled to the tubular wall 16 adjacent to the first end 18. A catch 56 is mounted on the tubular wall 16 adjacent to the second end 20. The latch 52 is releasably engageable with the catch 56. As can be seen in the Figures, the latch 52 includes an arm 58 pivotally coupled to a wing 60 that is itself pivotally coupled to the cover 12. The wing 60 allows the hook 54 to extend toward the catch 56, engage it and then the wing 60 and arm 58 are pivoted back into a recess in the cover 12. A tongue 62 is attached to the tubular wall 16 and extends away from the second end 20. The tongue 62 inter-fits with the first end 18 when the first 18 and second 20 ends are positioned adjacent to each other. That is, the tongue 62 is positioned between the steering wheel 14 and the first end 18 as the first end 18 overlaps the tongue 62 to fill any gap between the first 18 and second 20 ends. The tongue 62 is semi-cylindrically shaped.

Figure 8:
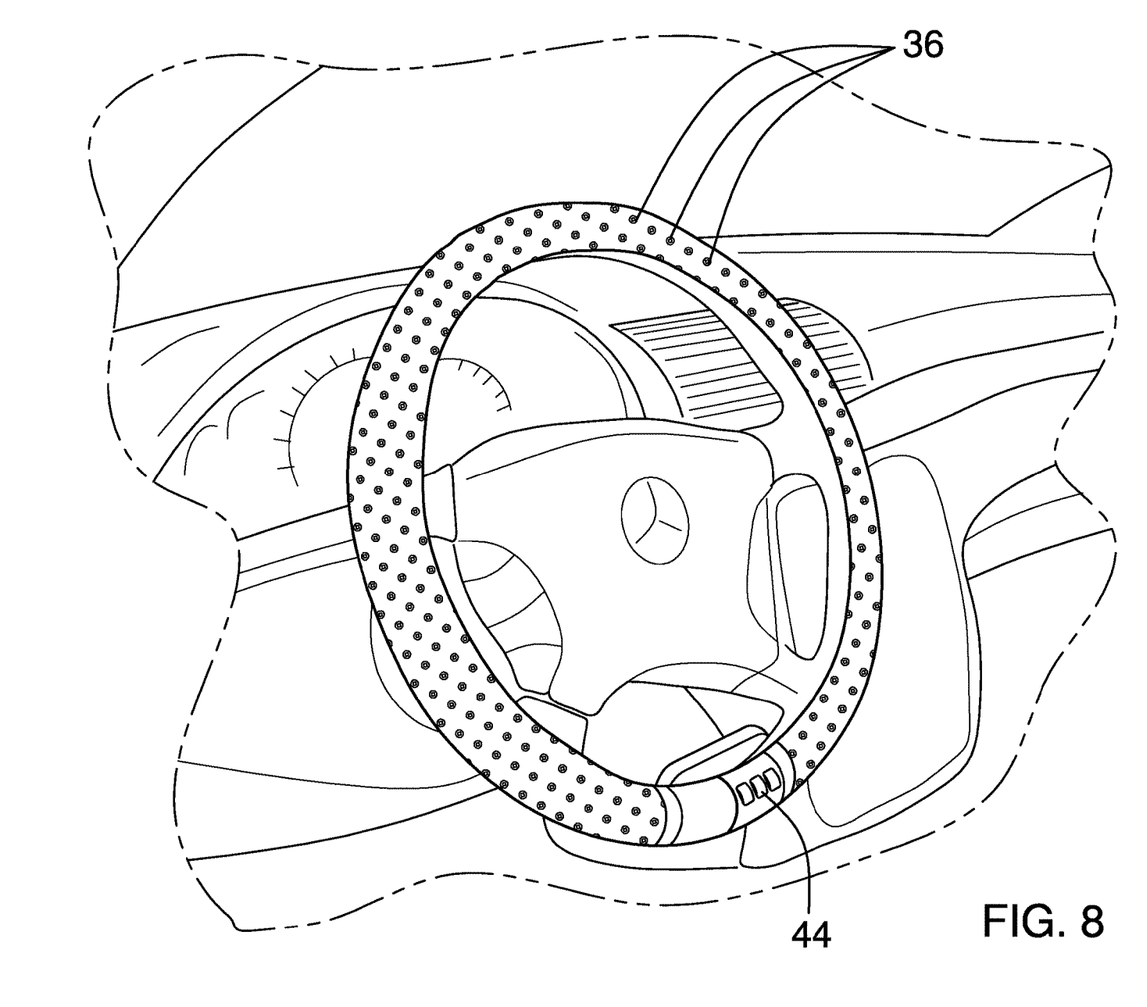
FIG. 8 is an in-use isometric view of an embodiment of the disclosure.
Figure 9:
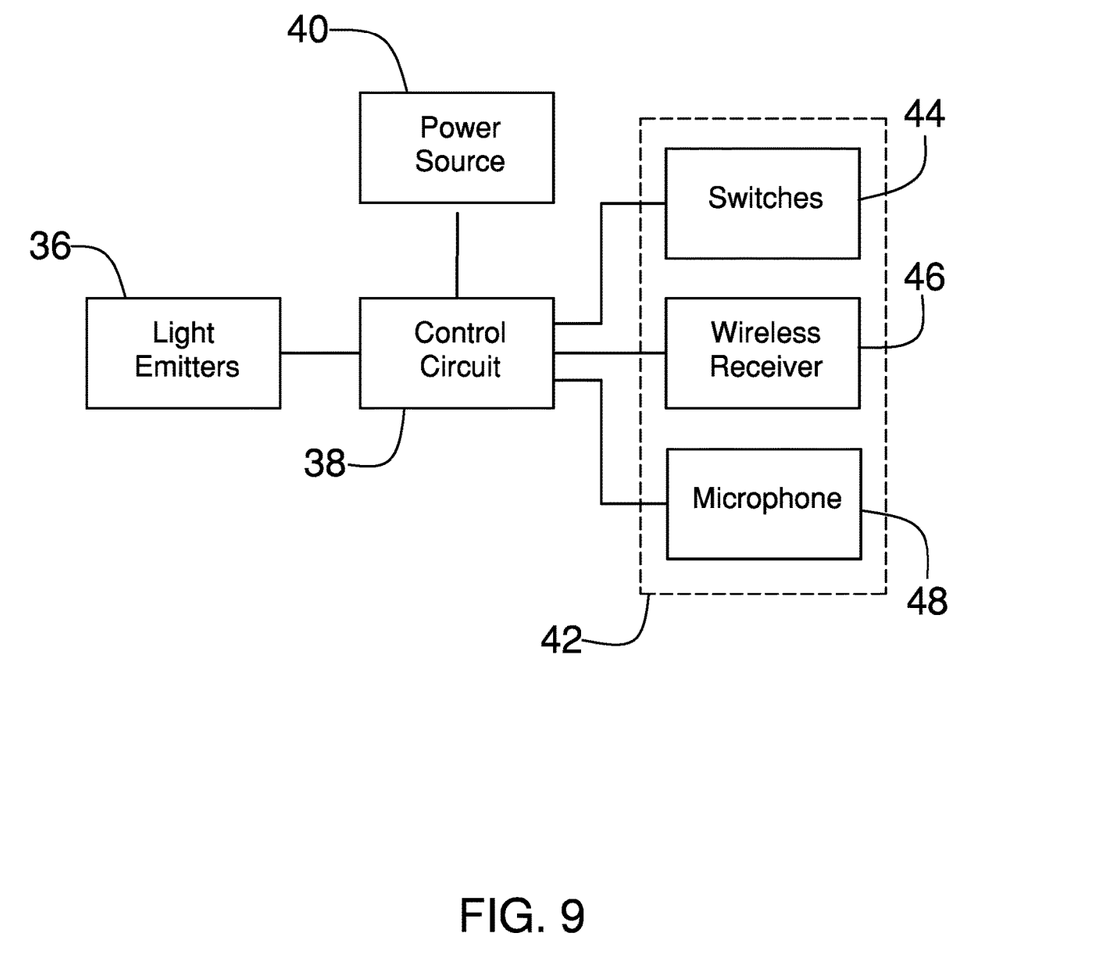
FIG. 9 is a schematic view of an embodiment of the disclosure.

In use, the cover 12 is placed on a conventional steering wheel 14 and secured in place. When desired, the light emitters 36 are actuated to a powered condition so that they emit light outwardly from the cover 12. As the cover 12 is translucent, the entire cover 12 will typically be illuminated when the light emitters 36 are turned on.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An illuminated steering wheel covering assembly configured to be positioned on a steering wheel, the assembly comprising:
    a cover being configured to being removably positioned on a steering wheel, the cover having a circular shape to match a circular shape of the steering wheel, the cover including a tubular wall having a first end and a second end wherein the first and second ends are positioned adjacent to each other, the tubular wall having a break therein extending through an inner surface and an outer surface of the tubular wall, the break extending from the first end to the second end, wherein the break is configured to receive the steering wheel such that the tubular wall is positioned on and covers a front side of the steering wheel, the break being defined between a first lateral edge and a second edge of the tubular wall, a first rod being positioned within the tubular wall, the first rod being positioned adjacent to and extending along a length of the first lateral edge, a second rod being positioned within the tubular wall, a second rod being positioned adjacent to and extending along a length of the second lateral edge, the first and second rods having a greater rigidity than the tubular wall and retaining the cover in the circular shape;
    a plurality of light emitters being mounted in the cover, the plurality of light emitters emitting light outwardly from the cover when turned on, each of the light emitters comprising an LED capable of emitting multiples colors;
    a control circuit being electrically coupled to each of the light emitters; and an actuator being electrically coupled to the control circuit, the actuator being actuated to turn the light emitters on or off.

2. The illuminated steering wheel covering assembly according to claim 1, wherein the tubular wall is comprised of a resiliently bendable material.

3. The illuminated steering wheel covering assembly according to claim 2, wherein the resiliently bendable material is a translucent material.

4. The illuminated steering wheel covering assembly according to claim 1, wherein the first and second rods are comprised of a metallic material.

5. The illuminated steering wheel covering assembly according to claim 1, further including a power source being electrically coupled to the control circuit, the power source comprising a rechargeable battery mounted on the cover.

6. The illuminated steering wheel covering assembly according to claim 1, wherein the actuators are actuated to cause the light emitters to emit light in one of a plurality of patterns.

7. The illuminated steering wheel covering assembly according to claim 6, wherein the actuator comprises a switch positioned on the cover.

8. The illuminated steering wheel covering assembly according to claim 6, wherein the actuator comprises a wireless receiver being in wireless communication with a controller configured to wirelessly send signals to the wireless receiver.

9. The illuminated steering wheel covering assembly according to claim 6, wherein the actuator comprises a microphone being configured to receive audible commands interpretable by the control circuit.

10. The illuminated steering wheel covering assembly according to claim 1, further including a closure being mounted on the tubular wall and releasably securing the first end to the second end.

11. The illuminated steering wheel covering assembly according to claim 10, wherein the closure includes:
a latch having a free end formed into a hook, the latch being pivotally coupled to the tubular wall adjacent to the first end; and
a catch being mounted on the tubular wall adjacent to the second end, the latch being releasably engageable with the catch.

12. The illuminated steering wheel covering assembly according to claim 11, further including a tongue being attached to the tubular wall and extending away from the second end, the tongue inter-fitting with the first end when the first and second ends are positioned adjacent to each other.

13. An illuminated steering wheel covering assembly configured to be positioned on a steering wheel, the assembly comprising:
a cover being configured to being removably positioned on a steering wheel, the cover having a circular shape to match a circular shape of the steering wheel, the cover including:
a tubular wall having a first end and a second end wherein the first and second ends are positioned adjacent to each other, the tubular wall having a break therein extending through an inner surface and an outer surface of the tubular wall, the break extending from the first end to the second end, wherein the break is configured to receive the steering wheel such that the tubular wall is positioned on and covers a front side of the steering wheel, the tubular wall being comprised of a resiliently bendable material, the resiliently bendable material being a translucent material, the break being defined between a first lateral edge and a second edge of the tubular wall;
a first rod being positioned within the tubular wall, the first rod being positioned adjacent to and extending along a length of the first lateral edge, a second rod being positioned within the tubular wall, the second rod being positioned adjacent to and extending along a length of the second lateral edge, the first and second rods having a greater rigidity than the tubular wall and retaining the cover in the circular shape, the first and second rods being comprised of a metallic material;
a plurality of light emitters being mounted in the cover, the plurality of light emitters emitting light outwardly from the cover when turned on, each of the light emitters comprising an LED capable of emitting multiples colors;
a control circuit being electrically coupled to each of the light emitters;
a power source being electrically coupled to the control circuit, the power source comprising a rechargeable battery mounted on the cover;
an actuator being electrically coupled to the control circuit, the actuator being actuated to turn the light emitters on or off, the actuators being actuated to cause the light emitters to emit light in one of a plurality of patterns, the actuator comprising:
a switch positioned on the tubular wall;
a wireless receiver being in wireless communication with a controller configured to wirelessly send signals to the wireless receiver;
a microphone being configured to receive audible commands interpretable by the control circuit;
a closure being mounted on the tubular wall and releasably securing the first end to the second end, the closure including:
a latch having a free end formed into a hook, the latch being pivotally coupled to the tubular wall adjacent to the first end;
a catch being mounted on the tubular wall adjacent to the second end, the latch being releasably engageable with the catch; and
a tongue being attached to the tubular wall and extending away from the second end, the tongue inter-fitting with the first end when the first and second ends are positioned adjacent to each other.

\* \* \* \* \*